United States Patent Office 3,108,977
Patented Oct. 29, 1963

3,108,977
COMPOSITION COMPRISING POLYCARBONATE AND SUCROSE ESTER AND CELLULOSIC WEB COATED THEREWITH
Edmund A. Wolff, Hamilton, Ohio, assignor to Champion Papers, Inc., Hamilton, Ohio, a corporation of Ohio
No Drawing. Filed Nov. 18, 1960, Ser. No. 70,128
5 Claims. (Cl. 260—9)

This invention relates to a novel composition and more particularly to cellulosic webs coated therewith.

High molecular weight aromatic polycarbonates containing recurring structural units of the formula:

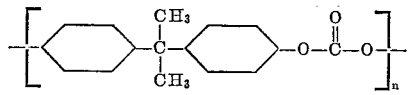

wherein $n$ is the number of repeating units in the polymer, are well known in the plastic industry. These plastics have been suggested for a number of uses including the production of films, fibers, coatings, moldings, etc., because of their outstanding mechanical properties and high stability to elevated temperatures. A drawback of this class of polycarbonates for some uses has been, however, the fact that they have a tendency under certain conditions to be quite inflexible. A further drawback of these polymers is the fact that their relatively high cost has limited use as a commercial coating material.

It is therefore an object of this invention to produce a novel composition containing a polycarbonate.

Still another object of this invention is the production of cellulosic webs which are coated with a novel composition containing a polycarbonate.

Still another object of this invention is the production of cellulosic webs which are coated with a novel polycarbonate composition and which possess outstanding physical properties as a barrier against water, moisture and grease.

In accordance with this invention it has been found that cellulosic webs can be coated with a solvent solution of the polycarbonate, as above described, and a sucrose compound having at least four alkanoate groups of the formula

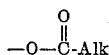

substituted thereon, in place of hydroxyl groups, Alk being an alkyl group of 1–3 carbon atoms.

Generally the sucrose esters have the formula:

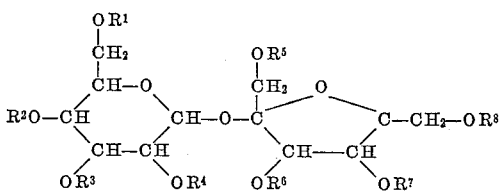

In the above formula, $R^1$ through $R^8$ are selected from the group consisting of hydrogen and radicals of the formula:

wherein Alk represents an alkyl radical from 1 to 3 carbon atoms, there being at least four

groups per molecule of the sucrose ester.

Methods for the production of the polycarbonates of the formula:

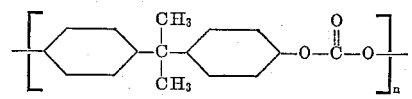

from 2,2-di-(p-hydroxyphenylene) propane or its derivatives are well described in the patent literature including U.S. Patent No. 2,946,766 to Schnell et al., and in particular Example I thereof. Other methods of producing these polycarbonates are set forth in Belgian Patents 546,376 and 546,377. A full description of the polycarbonates and their properties are set forth in an article by Schnell in Angewandte Chemie, vol. 68, No. 20, pages 633 to 660 (October 21, 1956). Ordinarily the molecular weight of the polymer will be such that $n$ has a value in excess of 50.

The sucrose esters, as above defined, are commercially available and the esterification methods of their preparation are also disclosed in the literature. Particularly preferred among the sucrose esters is sucrose hexa-isobutyrate di-acetate. This compound is normally represented by the above formula wherein $R^2$, $R^3$, $R^4$, $R^5$, $R^6$ and $R^7$ are isopropyl radicals and $R^1$ and $R^8$ are methyl radicals. Other sucrose esters include sucrose octa-acetate, sucrose octa-isobutyrate, sucrose hexa-isobutyrate and sucrose hexa-acetate. The last two mentioned compounds each possess two free hydroxyl groups and these are ordinarily present as the $R^4$ and $R^6$ radicals in the above formula. Obviously the position of the hydroxyl and/or acyl groups can be varied according to the method of their preparation. When the compounds are prepared to contain free hydroxyl groups or different types of acyl groups the product will often contain a mixture of isomers.

Although the sucrose esters have been suggested and employed as plasticizers, their use has primarily been confined to cellulose and cellulose derivative compositions. Since the polycarbonates have been characterized by their inability to be plasticized or extended by many of the typical materials, it is completely unexpected that they could be extended by this particular class of relatively inexpensive sucrose esters. It is particularly significant that a portion of the relatively expensive polycarbonate can be replaced by the comparatively inexpensive sucrose ester to form a composition having properties which are equal to or superior to the polycarbonate alone.

In order to prepare a composition of the polycarbonate and the sucrose ester they are preferably dissolved in a mutual solvent therefor. Examples of such solvents include methylene chloride, 2-butanone and dichlorodifluoro methane. The amount of solvent employed will depend primarily on the solubility of the polycarbonate therein. With most organic solvents it is difficult to dissolve more than about 20% by weight of the polycarbonate. The sucrose esters are ordinarily completely miscible with these solvents.

It has been found that the polycarbonates and sucrose esters should be used in the proportion of 1 to 120 parts by weight of sucrose ester per 100 parts by weight of polycarbonate. When the composition contains less than 1 part of the sucrose ester per 100 parts of polycarbonate, the latter fails to appreciably modify the properties of the polycarbonate. When the mixture contains more than 120 parts sucrose ester per 100 parts of polycarbonate the ester tends to bleed out of the mixture and form a separate phase thereon.

It is to be understood that the solvent solutions of the polycarbonate and sucrose ester may be modified by the addition of other ingredients, for example, dyes, pigments, etc.

The cellulosic webs coated with the compositions of this invention are particularly suitable as a decorative wrapping material because of their glossy appearance. In addition, the polycarbonate coatings are almost completely impervious to water, water vapor and grease, and hence, constitute a valuable product in the field of food and other packaging materials.

Cellulosic webs which are coated with the polycarbonate composition of this invention can be of a wide variety. Either bleached or unbleached stocks of paper and paperboard are suitable. In addition the webs may be primarily coated, semicoated or sized in order to decrease the absorption of the coating into the web. Normally, papers with basis weights between 13 and 120 pounds per ream (500 sheets, 25 x 38 inches) are suitable.

The amount of dry coating deposited upon the cellulosic web can vary widely. As little as 0.6 pound per ream (500 sheets, 25 x 38 inches) has been found to produce a satisfactory barrier against moisture and grease. In general, 1 to 10 pounds per ream will produce a satisfactory smooth surface of .1 to 2 mils thickness.

Conventional coating means such as a knife coater or roll coater can be employed in order to uniformly apply the coating to the web.

The following examples will serve to illustrate the invention. All parts are by weight unless otherwise stated.

*Example I*

A solution of the polycarbonate of 2,2-di-(p-hydroxyphenylene) propane was prepared by dissolving 12.5 parts of the polymer in 87.5 parts of methylene chloride. To this mixture is added 12.5 parts of sucrose hexa-isobutyrate di-acetate (the acetate radicals being predominately in the $R^1$ and $R^2$ position of the aforementioned formula) and the composition thoroughly mixed until a homogeneous blend is produced. The mixture was coated on a paper web using a blade coater. The coated web was subsequently dried at about 200° F. for approximately 60 seconds. Evaporation of the solvent resulted in a smooth glossy solid plastic film on the web. The coating was approximately 0.05 mil in thickness. The coated web was not penetrated by grease after standing for 24 hours. Other than having a significantly improved flexibility, the coating was virtually identical to a coating of the same weight in which the sucrose ester was not employed. Thus by using a composition containing a sucrose ester it has been found that substantially the same or improved properties can be achieved at a significantly lower cost.

*Example II*

Example I is repeated but this time employing only one part of sucrose hexa-isobutyrate di-acetate in the organic solvent solution. The product is considerably less flexible than that obtained in Example I. In all respects it is nearly identical to that obtained when no sucrose ester is employed.

*Example III*

Example I is repeated but using the same amount of sucrose hexa-isobutyrate (containing free hydroxyl groups predominately in the $R^4$ and $R^6$ position of the aforementioned formula) in place of the sucrose ester therein. A smooth glossy coating is again obtained.

Having thus disclosed the invention it will be apparent that various modifications thereof may be made which are within the spirit of the invention and the scope of the claims.

I claim:

1. A cellulosic web containing on at least one surface thereof a solid plastic film containing 1 to 120 parts by weight of at least one sucrose ester having at least four alkanoate groups of the formula

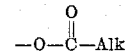

wherein Alk is an alkyl radical of 1 to 3 carbon atoms per molecule thereof, and 100 parts by weight of a polycarbonate of the formula

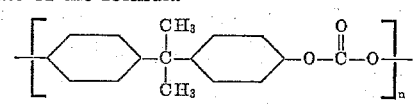

wherein $n$ is the number of repeating units in the polymer and is at least about 50.

2. The product of claim 1 wherein the sucrose ester contains eight alkanoate groups of the said formula per molecule, Alk being an isopropyl radical in six of said groups, and being a methyl radical in two of said groups.

3. A solid plastic composition containing 1 to 120 parts by weight of at least one sucrose ester having at least four alkanoate groups of the formula

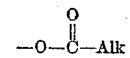

wherein Alk is an alkyl radical of 1 to 3 carbon atoms, per molecule thereof, and 100 parts by weight of a polycarbonate of the formula

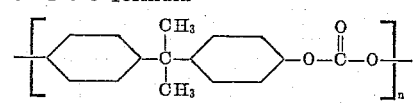

wherein $n$ is the number of repeating units in the polymer and is at least about 50.

4. The composition of claim 3 wherein the sucrose ester contains eight alkanoate groups of the said formula per molecule, Alk being an isopropyl radical in six of said groups, and being a methyl radical in two of said groups.

5. The composition of claim 3 containing additionally an inert organic solvent.

References Cited in the file of this patent

UNITED STATES PATENTS 2,035,578    Wagner _____ Mar. 31, 1936

FOREIGN PATENTS 578,585    Canada _____ June 30, 1959

OTHER REFERENCES

Buttrey: "Plasticizers," published by Interscience Publishers, New York, 1950, page 121.